United States Patent

Yokoyama

[11] Patent Number: 5,872,343
[45] Date of Patent: Feb. 16, 1999

[54] COMBINATION SWITCH DEVICE HAVING ROTATING CONNECTOR

[75] Inventor: Toshiaki Yokoyama, Tokyo, Japan

[73] Assignee: Niles Parts Co., Ltd., Japan

[21] Appl. No.: 803,517

[22] Filed: Feb. 20, 1997

[30] Foreign Application Priority Data

Mar. 1, 1996 [JP] Japan .................................. 8-071370

[51] Int. Cl.⁶ ................................................ H01R 35/04
[52] U.S. Cl. .......................................... 200/61.54; 439/15
[58] Field of Search .................................. 74/484 R, 492, 74/552; 200/61.27, 61.3, 61.31, 61.35, 61.36, 61.54, 61.55, 61.56; 439/15, 164, 165; 280/728.2, 731

[56] References Cited

U.S. PATENT DOCUMENTS

| | | | |
|---|---|---|---|
| 4,735,573 | 4/1988 | Zeller et al. | 439/15 |
| 4,840,078 | 6/1989 | Shitanoki | 74/484 R |
| 5,144,860 | 9/1992 | Furuhashi et al. | 74/552 |
| 5,450,769 | 9/1995 | Hu et al. | 74/492 |
| 5,460,535 | 10/1995 | Bolen | 439/164 |
| 5,496,978 | 3/1996 | Umezawa et al. | 200/61.3 |
| 5,593,310 | 1/1997 | Kawamoto et al. | 439/164 |
| 5,674,081 | 10/1997 | Hoffmann et al. | 439/164 |
| 5,704,633 | 1/1998 | Durrani et al. | 280/728.2 |

FOREIGN PATENT DOCUMENTS 62-18355  1/1987  Japan .............................. B60R 21/32

*Primary Examiner*—Michael A. Friedhofer
*Attorney, Agent, or Firm*—Ronald P. Kananen; Rader, Fishman & Grauer

[57] ABSTRACT

A combination switch device having a rotating connector (2) containing a spirally wound flexible wire (1), a cancel cam (3) arranged about a central axis of the rotating connector (2), and a combination switch main body (4). The cancel cam (3) is movable in an axial direction between a first position (S) and a second position (R). When the cancel cam (3) moves to the first position (S), a bear (31) of the cancel cam (3) engages with a claw (41) of the combination switch main body (4). At the same time, a convex portion (32) of the cancel cam (3) engages with a concave portion (23) of a rotor attachment (22) attached to a rotor (21), whereby the rotor (21) is held at a neutral position. Thus, the rotating connector can be held at a neutral position without requiring special parts by modifying an existing structure of a combination switch device having a rotating connector.

14 Claims, 5 Drawing Sheets

COMBINATION SWITCH DEVICE HAVING ROTATING CONNECTOR

BACKGROUND OF THE INVENTION

1. Field of the Invention

The present invention relates to a combination switch device having a rotating connector for electrically connecting together a car body and a steering wheel. More specifically, the present invention relates to a structure for holding a rotor of a rotating connector at a neutral position until a combination switch device is attached to a bracket of a steering column and a rotor of the rotating connector is engaged with the steering wheel.

2. Description of the Related Art

Rotating connectors have been used to supply electricity from a car body to an air bag circuit or the like arranged on a steering wheel. A typical rotating connector contains a spirally wound flexible wire which, when a rotor of the rotating connector rotates by handling the steering wheel, is wound in or out within the rotating connector. The rotating connector thereby provides an electric route between the car body and the steering wheel.

The maximum number of rotations of a conventional rotating connector is limited by the number of turns of the flexible wire contained within the rotating connector. Thus, if the position of the steering wheel is not aligned properly with the rotating position of the rotating connector, the flexible wire may be wound up in the rotating connector before the steering wheel is rotated to its intended leftmost or rightmost position for turning. As a result, the steering wheel may be difficult to control, or the flexible wire may be disconnected.

To overcome this problem in the conventional rotating connector, the rotor of the rotating connector has been held at a neutral position until it is engaged to the steering wheel. The rotating connector is thus attached to the steering wheel at a neutral position in advance, whereby both the devices are assembled at appropriate rotating positions. For example, Japanese Patent Application Laid-Open No. Sho 62-18355 discloses a technique wherein a special lock material is used to hold the rotor of a rotating connector at a neutral position.

However, in the prior art described above, special parts are required to hold the rotor of the rotating connector at a neutral position. As a result, the number of parts of the rotating connector increased, and the number of processes to store the special parts also increased.

SUMMARY OF THE INVENTION

It is an object of the present invention to provide a combination switch device that solves the problems associated with the conventional switch devices described above.

More specifically, it is an object of the present invention to provide a combination switch device having a rotating connector that enables a rotor of the rotating connector to be held at a neutral position without setting special parts, by modifying an existing structure of the combination switch device.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a combination switch device is provided comprising a rotating connector containing a flexible wire wound spirally therein for electrically connecting a car body and a steering wheel, and a cancel cam arranged about a central axis of the rotating connector. The combination switch device is characterized by the cancel cam being movable between a first position and a second position, and the cancel cam having stoppers that engage with both the rotating connector and a combination switch main body when the cancel cam moves to the first position for holding a rotor of the rotating connector in a neutral position.

A first one of the stoppers preferably comprises a claw formed on at least one of the cancel cam and the combination switch main body, and a bear that corresponds to the claw formed on at least the other one of the cancel cam and the combination switch main body. The bear and the claw are engaged with each other when the cancel cam moves to the first position to prevent the cancel cam from rotating relative to the combination switch main body. The bear and the claw are disengaged from each other when the cancel cam moves to the second position to let the cancel cam rotate freely relative to the combination switch main body.

The cancel cam preferably has an engaging portion which is engageable with a steering wheel for moving the cancel cam to the second position. The bear and the claw of the first stopper are disengaged from each other when the cancel cam is moved to the second position.

A second one of the stoppers preferably comprises a convex portion formed on at least one of the cancel cam and the rotor, and a concave portion formed on at least the other one of the cancel cam and the rotor. The convex portion and the concave portion of the second stopper are engaged with each other when the cancel cam is moved to the first position to prevent the rotor from rotating relative to the cancel cam. The convex portion and the concave portion of the second stopper are disengaged from each other when the cancel cam is moved to the second position to let the rotor rotate freely relative to the cancel cam.

The rotor preferably has a rotor attachment for attaching the rotor to the combination switch main body, and at least a portion of the second stopper is formed on the rotor attachment.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

The preferred embodiment of the present invention will now be described, by way of example, with reference to FIGS. 1 to 6 of the accompanying drawings.

Figure 1:
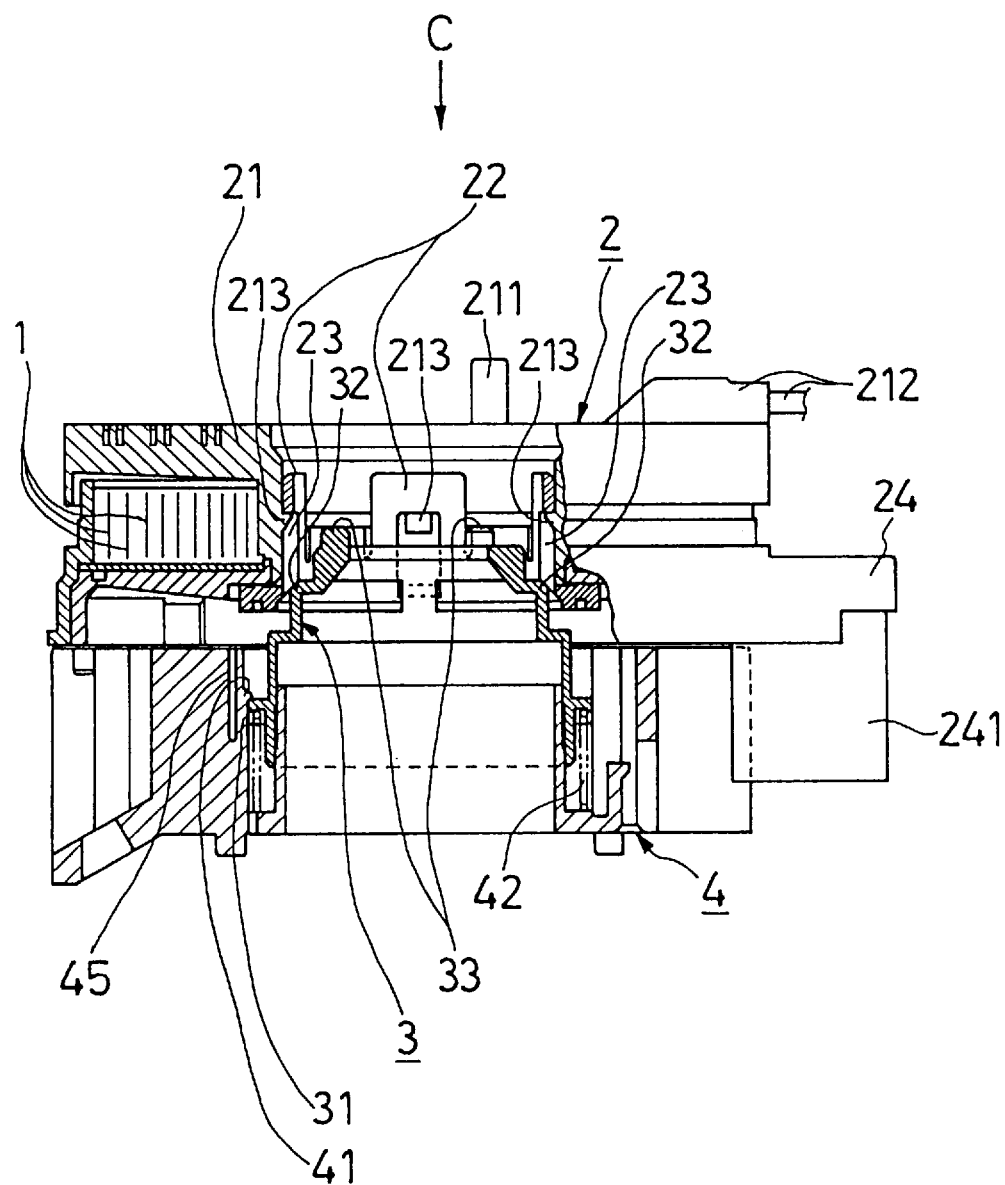
FIG. 1 is a side view showing a cut-away portion of a preferred embodiment of a combination switch device having a rotating connector according to the present invention.

As shown in FIG. 1, a flexible wire 1 is provided for electrically connecting circuits on a car body side of the switch and circuits on a steering wheel side of the switch. The flexible wire 1 comprises plural band copper wires laminated by a resin film, such as polyethylene telephthalate resin and the like. The flexible wire 1 is spirally wound and contained within a rotating connector 2.

The rotating connector 2 has a rotor 21, a rotor attachment 22, and a stator 24. The rotor 21 rotates with the steering wheel by inserting a pin 211 into a hole arranged at the rear side of the steering wheel. One end of the flexible wire 1 is connected to a connector 212 of the rotor 21, and is electrically connected via the connector 212 to circuits, such as an air bag circuit and the like, arranged on the steering wheel. The other end of the flexible wire 1 is connected to a connector 241 of the stator 24, and is electrically connected via the connector 241 to circuits, such as an air bag controller and the like, arranged on the car body side of the switch. The rotor attachment 22 is a part of the rotor 21 that connects the rotor 21 and the stator 24 so as to be structured integrally with the combination switch main body 4. The rotor 21 is thus attached to the combination switch main body 4.

A cancel cam 3 works together with a ratchet mechanism (not shown) of a turn signal switch built into the combination switch main body 4. The cancel cam 3 returns a turn signal lever that is manipulated to a right turn position or a left turn position to the neutral position automatically. The cancel cam 3 is arranged about the central axis of the rotating connector 2 and the outer circumference of a steering shaft (not shown) when the combination switch main body 4 is attached to the bracket of the steering column.

Figure 2:
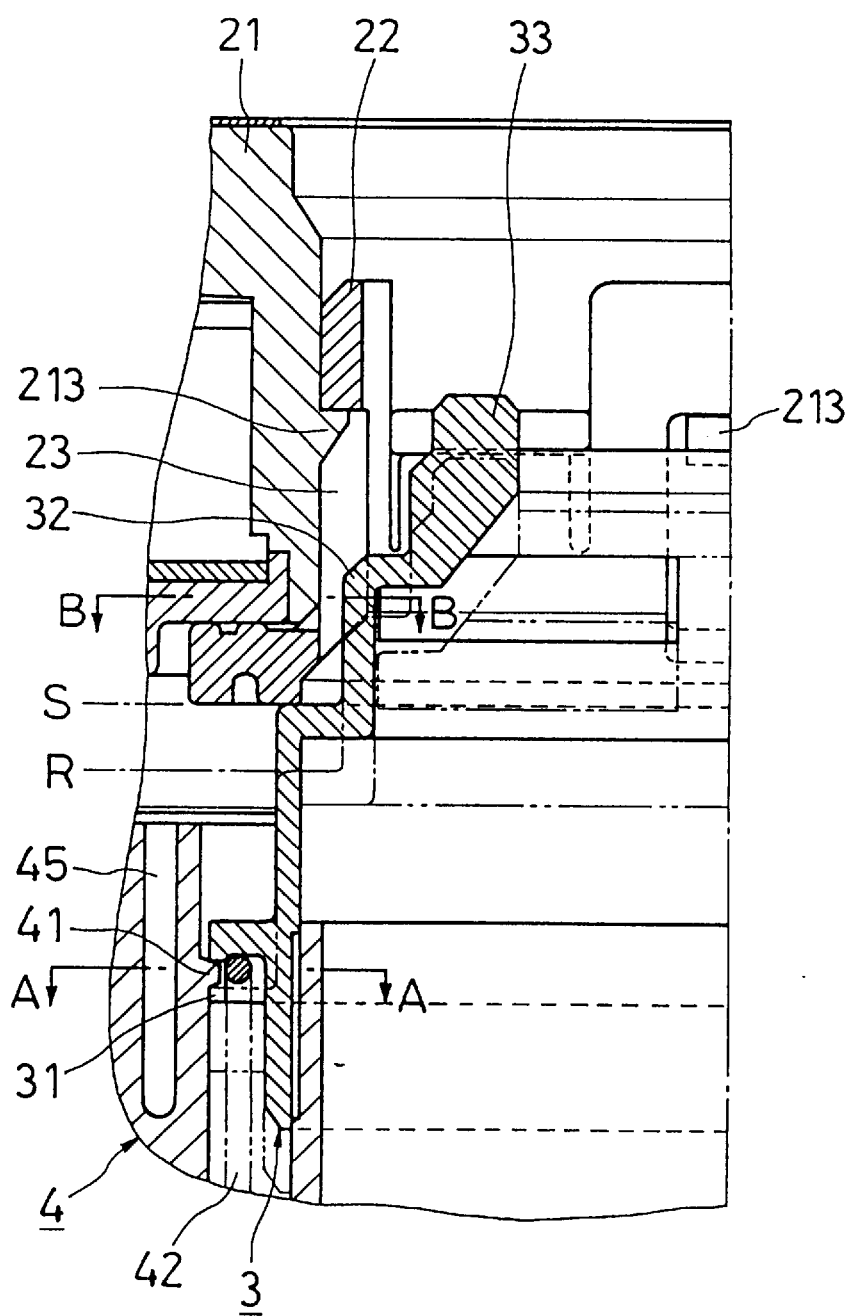
FIG. 2 is an enlarged cross-sectional view of a portion of the embodiment shown in FIG. 1, showing a cancel cam of the rotating connector in a first position.
Figure 3:
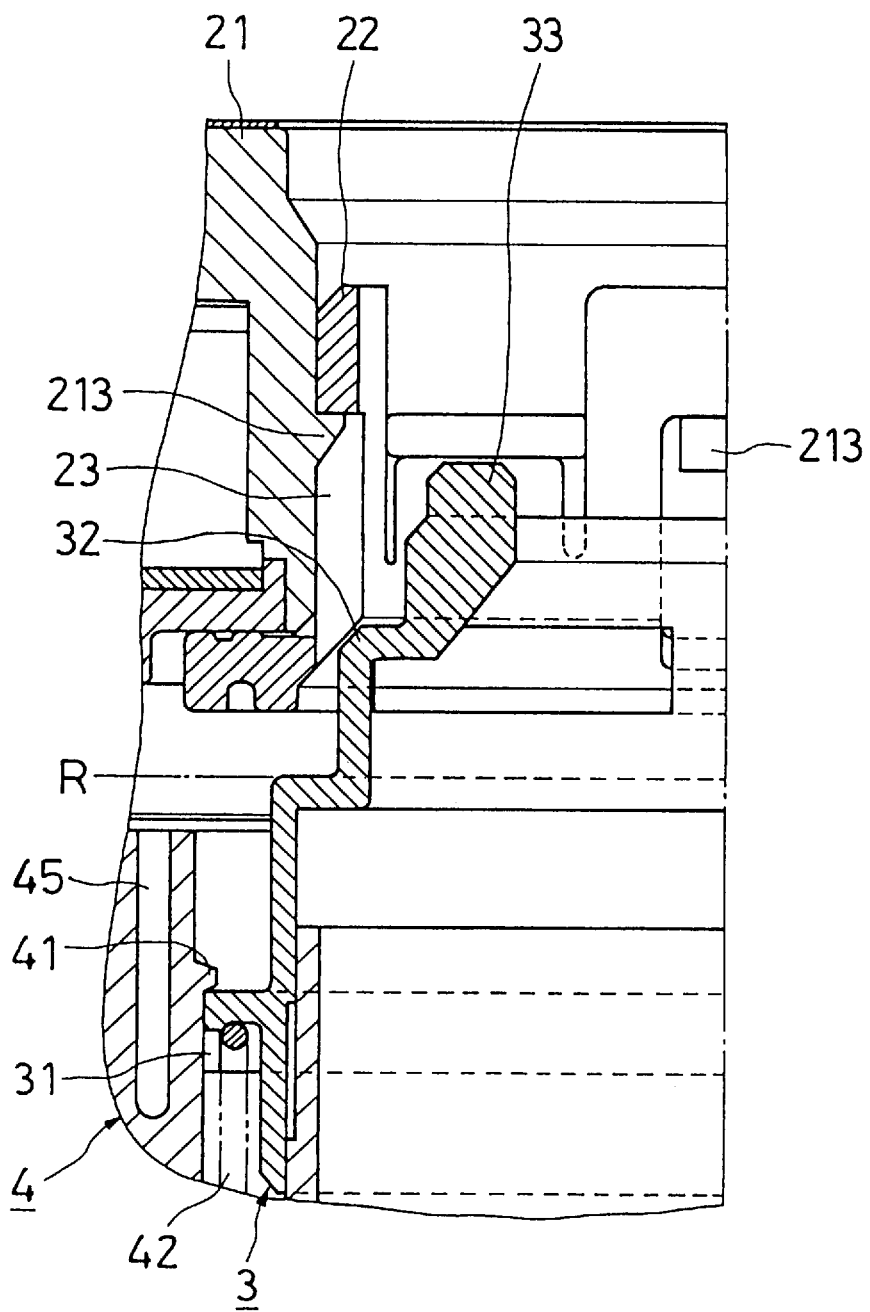
FIG. 3 is an enlarged cross-sectional view of a portion of the embodiment shown in FIG. 1, showing a cancel cam of the rotating connector in a second position.

As shown in FIGS. 2 and 3, the cancel cam 3 is movable between a first position S and a second position R in an axial direction. The first position S is a position where the cancel cam 3 engages with both the rotor 21 of the rotating connector 2 and the combination switch main body 4 and holds the rotor 21 of the rotating connector 2 at a neutral position. The second position R is a position where the cancel cam 3 separates from both the rotor 21 of the rotating connector 2 and the combination switch main body 4 and allows the rotor 21 and the cancel cam 3 to rotate freely. A stopper arrangement is provided to hold the rotor 21 at a neutral position when the cancel cam 3 is in the first position S.

In the preferred embodiment, the stopper arrangement comprises a first stopper and a second stopper. The first stopper comprises a first structure in the form of a bear 31 formed on the cancel cam 3 and a second structure in the form of a claw 41 formed on the combination switch main body 4. The second stopper comprises a convex portion 32 formed on the cancel cam 3 and a concave portion 23 formed on the rotor attachment 22 of the rotor 21. The rotor 21 has plural protrusions 213 to elastically engage the rotor attachment 22. The concave portion 23 formed on the rotor attachment 22 also functions to engage with the protrusions 213 of the rotor 21 so as to connect the rotor 21 and the stator 24 by the rotor attachment 22.

The bear 31 and the claw 41 forming the first stopper, and the convex portion 32 and the concave portion 23 forming the second stopper, are designed to engage with each other by setting the rotor 21 at a neutral position and moving the cancel cam 3 to the first position S. The cancel cam 3 has an engaging portion 33 in addition to the bear 31 and the convex portion 32, and is so designed that when the engaging portion 33 engages with the steering wheel, the cancel cam 3 moves to the second position R.

Figure 4:
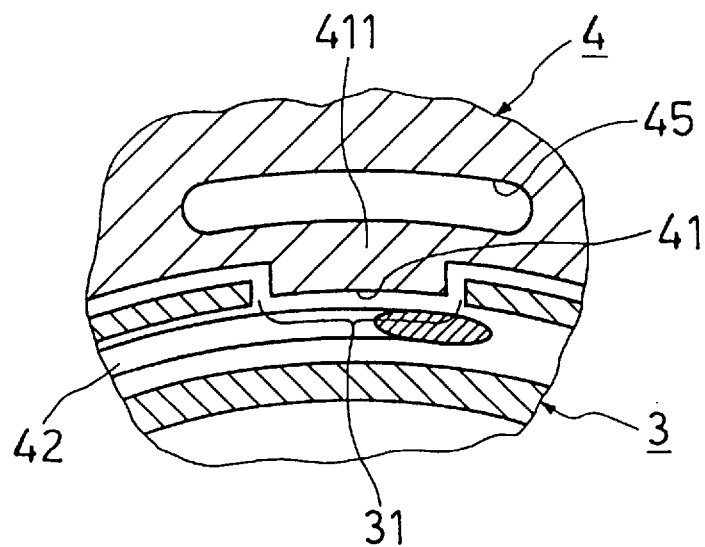
FIG. 4 is a cross-sectional view taken along the line A—A in FIG. 2.
Figure 5:
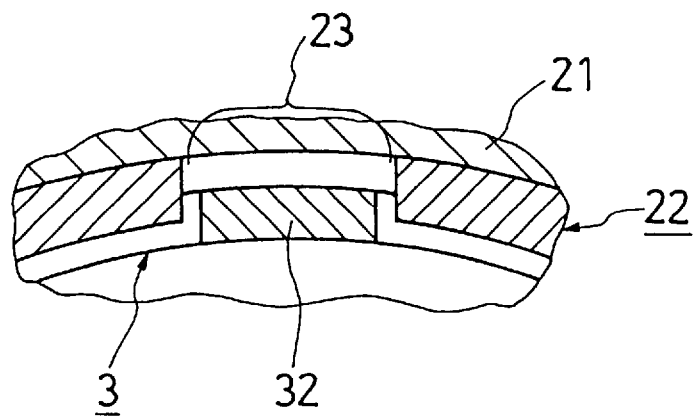
FIG. 5 is a cross-sectional view taken along the line B—B in FIG. 2.
Figure 6:
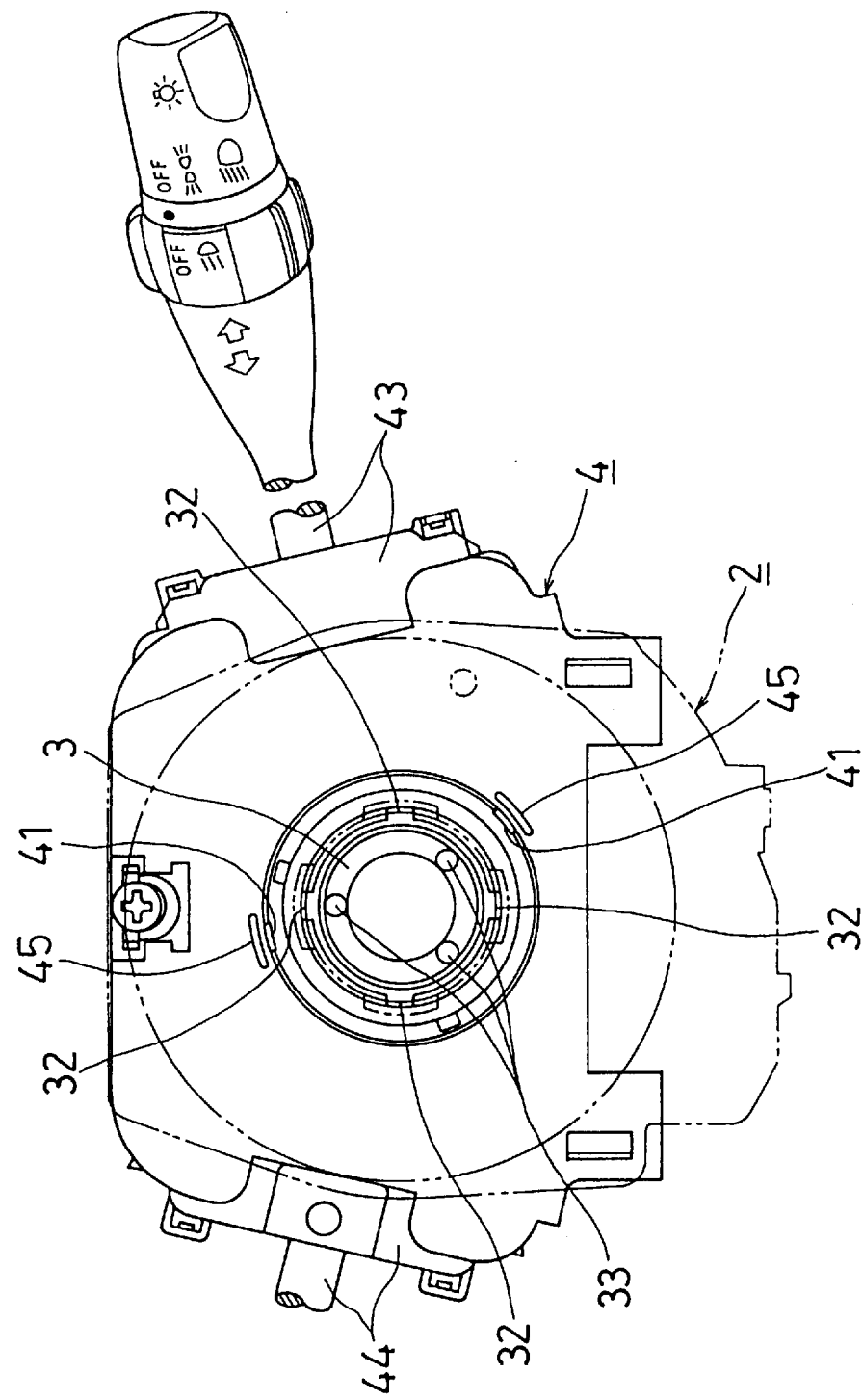
FIG. 6 is a top view of the combination switch main body, as viewed in the direction of arrow C in FIG. 1.

The combination switch main body 4, as shown in FIG. 6, comprises a set of switches including a lighting flasher system lever switch 43 and a wiper system lever switch 44. The rotating connector 2 is formed integral with the combination switch main body 4. The combination switch main body 4 has a return spring 42 and a long hole 45 in addition to the claw 41. The return spring 42 is a structure to push the cancel cam 3 back to the side of the rotating connector 2, i.e., to the first position S. The long hole 45 is arranged at the rear of the claw 41, as shown in FIG. 4. The long hole 45 is arranged to easily pinch a formed portion 411 of the claw 41. The arrangement of the long hole 45 enables the claw 41 to elastically engage with the bear 31 of the cancel cam 3, and to easily separate from the bear 31. In FIG. 6, the rotating connector 2 is shown in dashed lines.

The operation of the combination switch device according to the present invention will be explained in more detail by reference to FIGS. 2 and 3. FIG. 2 shows the combination switch main body 4 before attaching to a car body, wherein the cancel cam 3 is in the first position S shown in solid line, and the rotor 21 is held at a neutral position. When the cancel cam 3 is in the first position S shown in solid line in FIG. 2, the bear 31 of the cancel cam 3 engages with the claw 41 of the combination switch main body 4, whereby the rotation of the cancel cam 3 relative to the main body 4 is prevented. At the same time, the convex portion 32 of the cancel cam 3 engages with the concave portion 23 of the rotor attachment 22 and part of the rotor 21, whereby the rotation of the rotor 21 relative to the cancel cam 3 is prevented. When the claw 41 engages with the bear 31 at the same time when the concave portion 23 engages with the convex portion 32, the rotor 21 is held at a neutral position.

FIG. 3 shows a main body 4 of the combination switch attached to a bracket of the steering wheel of a car body. The steering wheel is engaged with the engaging portion 33 of the cancel cam 3, whereby the cancel cam 3 moves to the second position R shown in solid line, and the rotor 21 that has been held is now made free. When the cancel cam 3 moves to the second position R shown in solid line in FIG. 3, the bear 31 of the cancel cam 3 is separated from the claw 41 of the combination switch main body 4, whereby the cancel cam 3 is able to rotate freely relative to the main body 4. At the same time, the convex portion 32 of the cancel cam 3 is separated from the concave portion 23 of the rotor attachment 22 configuring part of the rotor 21, whereby the rotor 21 is also able to rotate freely relative to the cancel cam 3. The bear 31 and the claw 41 are disengaged at the same time when the convex portion 32 and the concave portion 23 are disengaged, thereby allowing both the rotor 21 and the cancel cam 3 to rotate freely.

In the embodiment described above, the concave portion configuring the second stopper is arranged to the rotor attachment as part of the rotor. However, other arrangements are also possible. For example, the concave portion may be arranged on the rotor main body, or the concave portion may be arranged on the cancel cam and the convex portion may be arranged on the rotor.

Moreover, in the embodiment described above, two stoppers are arranged at the cancel cam. However, it is possible to form a stopper structure wherein the cancel cam can engage with both the rotor and the combination switch main body at the first position.

Moreover, in the embodiment described above, the stator is elastically engaged with the combination switch main body. However, the stator may also be formed on the combination switch main body.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The present invention, as described above, does not require any special parts to hold the rotor of the rotating connector at a neutral position during assembly. In addition, the present invention enables the rotor to be held at a neutral position by only slightly modifying the shape of the existing cancel cam and the like equipped in the combination switch device. Therefore, the present invention does not increase the number of parts nor require any additional process steps to store special parts.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A combination switch device, comprising:
    a rotating connector (2) containing a flexible wire (1) wound spirally therein for electrically connecting a car body and a steering wheel; and
    a cancel cam (3) arranged about a central axis of the rotating connector (2);
    wherein the cancel cam (3) is movable between a first position (S) and a second position (R), said cancel cam having stoppers (31 and 32) that engage with both the rotating connector (2) and a combination switch main body (4) when the cancel cam is in said first position (S) for holding a rotor (21) of the rotating connector (2) in a neutral position.

2. The combination switch device as set forth in claim 1, wherein a first one of said stoppers comprises a first structure (31) formed on at least one of the cancel cam (3) and the combination switch main body (4), and a second structure (41) that corresponds to the first structure (31) formed on at least the other one of the cancel cam (3) and the combination switch main body (4), the first structure (31) and the second structure (41) being engaged with each other when the cancel cam (3) moves to the first position (S) to prevent the cancel cam (3) from rotating relative to the combination switch main body (4), and the first structure (31) and the second structure (41) being disengaged from each other when the cancel cam (3) moves to the second position (R) to let the cancel cam (3) rotate freely relative to the combination switch main body (4).

3. The combination switch device as set forth in claim 2, wherein said cancel cam (3) has an engaging portion (33) which is engageable with a steering wheel for moving the cancel cam (3) to the second position (R), and wherein the first structure (31) and the second structure (41) of the first stopper disengage from each other when said cancel cam (3) is moved to the second position (R).

4. The combination switch device as set forth in claim 3, wherein a second one of said stoppers comprises a convex portion (32) formed on at least one of the cancel cam (3) and the rotor (21), and a concave portion (23) formed on at least the other one of the cancel cam (3) and the rotor (21), the convex portion (32) and the concave portion (21) of the second stopper being engaged with each other when the cancel cam (3) is in said first position (S) to prevent the rotor (21) from rotating relative to the cancel cam (3), and the convex portion (32) and the concave portion (23) of the second stopper being disengaged from each other when the cancel cam (3) is moved to the second position (R) to let the rotor (21) rotate freely relative to the cancel cam (3).

5. The combination switch device as set forth in claim 4, wherein the rotor (21) has a rotor attachment (22) for attaching the rotor (21) to the combination switch main body (4), and at least a portion of the second stopper is formed on the rotor attachment (22).

6. The combination switch device as set forth in claim 2, wherein a second one of said stoppers comprises a convex portion (32) formed on at least one of the cancel cam (3) and the rotor (21), and a concave portion (23) formed on at least the other one of the cancel cam (3) and the rotor (21), the convex portion (32) and the concave portion (21) of the second stopper being engaged with each other when the cancel cam (3) is in said first position (S) to prevent the rotor (21) from rotating relative to the cancel cam (3), and the convex portion (32) and the concave portion (23) of the second stopper being disengaged from each other when the cancel cam (3) is moved to the second position (R) to let the rotor (21) rotate freely relative to the cancel cam (3).

7. The combination switch device as set forth in claim 6, wherein the rotor (21) has a rotor attachment (22) for attaching the rotor (21) to the combination switch main body (4), and at least a portion of the second stopper is formed on the rotor attachment (22).

8. The combination switch device as set forth in claim 1, wherein said stoppers comprise a first stopper and a second stopper, said second stopper comprises a convex portion (32) formed on at least one of the cancel cam (3) and the rotor (21), and a concave portion (23) formed on at least the other one of the cancel cam (3) and the rotor (21), the convex portion (32) and the concave portion (21) of the second stopper being engaged with each other when the cancel cam (3) is in said first position (S) to prevent the rotor (21) from rotating relative to the cancel cam (3), and the convex portion (32) and the concave portion (23) of the second stopper being disengaged from each other when the cancel cam (3) is moved to the second position (R) to let the rotor (21) rotate freely relative to the cancel cam (3).

9. The combination switch device as set forth in claim 8, wherein the rotor (21) has a rotor attachment (22) for attaching the rotor (21) to the combination switch main body (4), and at least a portion of the second stopper is formed on the rotor attachment (22).

10. A combination switch device, comprising:
    a rotating connector having a flexible wire wound spirally therein;
    a combination switch main body on which said rotating connector is mounted; and
    a cancel cam arranged about a central axis of the rotating connector, said cancel cam being movable between a first position and a second position, said cancel cam having stopper means which engage with both the rotating connector and the combination switch main body when the cancel cam is in said first position for holding a rotor of the rotating connector in a neutral position, said stopper means becoming disengaged from at least one of said rotating connector and said combination switch main body when said cancel cam moves to the second position to thereby permit the rotor of said rotating connector to move freely relative to said combination switch main body.

11. The combination switch device as set forth in claim 10, wherein said stopper means comprises a first structure formed on at least one of the cancel cam and the combination switch main body, and a second structure that corresponds to the first structure formed on at least the other one of the cancel cam and the combination switch main body, the first structure and the second structure being engaged with each other when the cancel cam is in said first position to prevent the cancel cam from rotating relative to the combination switch main body, and the first structure and the second structure being disengaged from each other when the cancel cam moves to the second position to let the cancel cam rotate freely relative to the combination switch main body.

12. The combination switch device as set forth in claim 11, wherein said cancel cam has an engaging portion which is engageable with a steering wheel for moving the cancel cam to the second position, and wherein the first structure and the second structure of the stopper means disengage from each other when said cancel cam is moved to the second position.

13. The combination switch device as set forth in claim 12, wherein said stopper means further comprises a convex portion formed on at least one of the cancel cam and the rotor of the rotating connector, and a concave portion formed on at least the other one of the cancel cam and the rotor, the convex portion and the concave portion of the stopper means being engaged with each other when the cancel cam is in said first position to prevent the rotor from rotating relative to the cancel cam, and the convex portion and the concave portion of the stopper means being disengaged from each other when the cancel cam is moved to the second position to let the rotor rotate freely relative to the cancel cam.

14. The combination switch device as set forth in claim 10, wherein said cancel cam further comprises means for automatically returning a turn signal lever from a right turn position and a left turn position to a neutral position.

* * * * *